United States Patent [19]

Hulsebus et al.

[11] Patent Number: 4,916,034
[45] Date of Patent: Apr. 10, 1990

[54] BATTERY VENT STRIP

[75] Inventors: Randy K. Hulsebus, Colgate; Edward N. Mrotek, Grafton, both of Wis.; Paul J. Buckethal, Villa Hills; Lanny D. Lower, Fort Mitchell; Gerald A. Cummins, Dry Ridge, all of Ky.

[73] Assignee: Globe-Union Inc., Milwaukee, Wis.

[21] Appl. No.: 241,717

[22] Filed: Sep. 8, 1988

[51] Int. Cl.⁴ ................. H01M 2/12; H01M 2/08
[52] U.S. Cl. ......................... 429/86; 429/88; 429/175
[58] Field of Search ................. 429/86–88, 429/175

[56] References Cited

U.S. PATENT DOCUMENTS

| 3,879,227 | 4/1975 | Hennen | 429/86 |
| 4,117,205 | 9/1978 | Kitai | 429/88 X |
| 4,207,387 | 6/1980 | Jutte | 429/88 |
| 4,214,045 | 7/1980 | Jutte et al. | 429/87 |
| 4,483,069 | 7/1984 | Greenlee | 429/88 X |
| 4,851,305 | 7/1989 | Kump et al. | 429/175 X |

Primary Examiner—Stephen J. Kalafut
Attorney, Agent, or Firm—Foley & Lardner

[57] ABSTRACT

A removable strip adapted to be placed in a gas tight relationship with the top of a battery enclosure housing a plurality of channels and providing gaseous communication from a plurality of battery cells to a flame arrester located internally in the battery.

9 Claims, 2 Drawing Sheets

BATTERY VENT STRIP

BACKGROUND OF THE INVENTION

1. Field of the Invention

The present invention involves the use of manifold venting strips in lead acid batteries.

2. Description of the Prior Art

Considerable improvement has been made in the venting of gases in storage batteries typified by lead acid secondary batteries over the last fifteen years. A vexatious problem prior thereto was the accumulation of gases within the battery enclosure and respective cells during charging and discharging of the battery. Earlier venting arrangements are disclosed in U.S. Pat. No. 3,265,538 issued Aug. 9, 1966 and entitled Multiple Vent Plug Assembly; U.S. Pat. No. 3,284,244 issued Nov. 11, 1966 and entitled Multiple Vent Plug Assembly and U.S. Pat. No. 3,597,280 issued Aug. 3, 1971 and entitled Multiple Vent Plug Assembly. A particularly attractive venting arrangement is described in detail in U.S. Pat. No. 3,879,227 issued Apr. 22, 1975 to Henning and entitled Battery Vent Plug. The gang type vent disclosed in the patent permits flow of the gases from the individual cells to a single diffuser which vents the gas to the atmosphere while at the same time retarding the flow of the electrolyte into the vent should the battery not be maintained on a horizontal plane.

A typical vent plug, as described in U.S. Pat. No. 3,879,227, includes passageways for allowing the flow of gas from the individual battery cells to a porous diffusing element, and then to a passageway leading to an external vent located in the battery enclosure. The vent plug thus provides a housing for the diffusing element and respective channels leading to and passageways leading from the diffusing element. The vent plug itself is removably insertable into one or more of the ports within the top of the battery enclosure, such ports permitting direct access into the individual cells of the battery. Thus, the generated gas during battery operation rises into the ports leading to the vent plug passageways, filters through the flame arrester or diffuser, and dissipates into the atmosphere.

A disadvantage, however, with this type of vent plug arrangement is that the plug, due to its exterior positioning and removability, is susceptible to damage due to mishandling or even removal of the flame arrester, affording the possibility that the diffusing and venting function of the plug could be compromised. A solution to this problem, particularly with the advent of the sealed batteries, is the relocation of the elements providing such functions into the interior of the battery. Thus, the aforementioned disadvantage has largely been obviated, for example, by securely attaching the housing containing the diffuser or flame arrester elements to the undersurface of said cover, i.e. within the battery enclosure. Additionally, passageways leading from the various cells to the flame arrester are fabricated in the internal structure of the battery itself. For example, such passageways from cells are often formed by a series of grooves along the top surface of the battery extending from the mouth of each of several cell ports to the mouth of the centrally located port. Once the proper amount of electrolyte is added to the cells through the ports, one or more strips either essentially planar or having complimentary grooves, is placed over the ports and heat sealed into place to preserve the sealed integrity of the sealed battery. The strip sealed over and enclosing the grooves thus provides the passageways extending to a central disposed port which in turn are in gaseous communication via a channel to the diffusing element. A vent to the atmosphere disposed adjacent to the diffusing element allows the gas to pass through the element and dissipate into the atmosphere.

While the aforementioned structure is admirably suited for the sealed or so-called maintenance-free batteries, it has not proven to be entirely satisfactory for battery applications where it is desired to have ready access to the interior of the battery. Continuous removal of the strip which is sealed to the battery top to provide access to the battery cells may result in deleterious effects to the strip itself. Repeated removal of such a strip is a highly uneconomical technique. Additionally, loosely securing the strip to the top, in an effort to overcome repeated removal and sealing, would result in the gases leaking through the strip-battery interfaces and not moving, as desired, through the diffusing element. It is, therefore, desired to have a battery which is suited for easy access into the interior of the cell for addition of fluid to the electrolyte and the like while preserving the venting function through an interiorly positioned flame arrester.

SUMMARY OF THE INVENTION

The need for a battery having a gas diffuser or flame arrester and venting passages located in the interior of the battery, yet providing ready access to the interior of the battery, has been met by a battery having the venting apparatus of the present invention. Such a battery has an enclosure with a top which houses a plurality of separated cells, the top having a plurality of individual ports each in gaseous communication with a respective cell. The flame arrester is disposed within the housing and is in gaseous communication with one of the cells and respective port. A removable strip adapted to be removably placed over the ports and in a gas tight relationship with the battery top has a plurality of enclosed passageways or tunnels which are placed in gaseous communication with each of the ports when the strip is positioned over the ports thereby placing each cell in direct gaseous communication with the flame arrester. Additionally, the removable strip and the surface of the battery top about the ports may have complimentary configurations such as that the strip, when in position, and top surface are essentially co-planar.

BRIEF DESCRIPTION OF THE DRAWINGS

A preferred exemplary embodiment of the present invention will hereinafter be described wherein like numerals denote like elements and.

DETAILED DESCRIPTION OF THE PREFERRED EMBODIMENT

Figure 1:
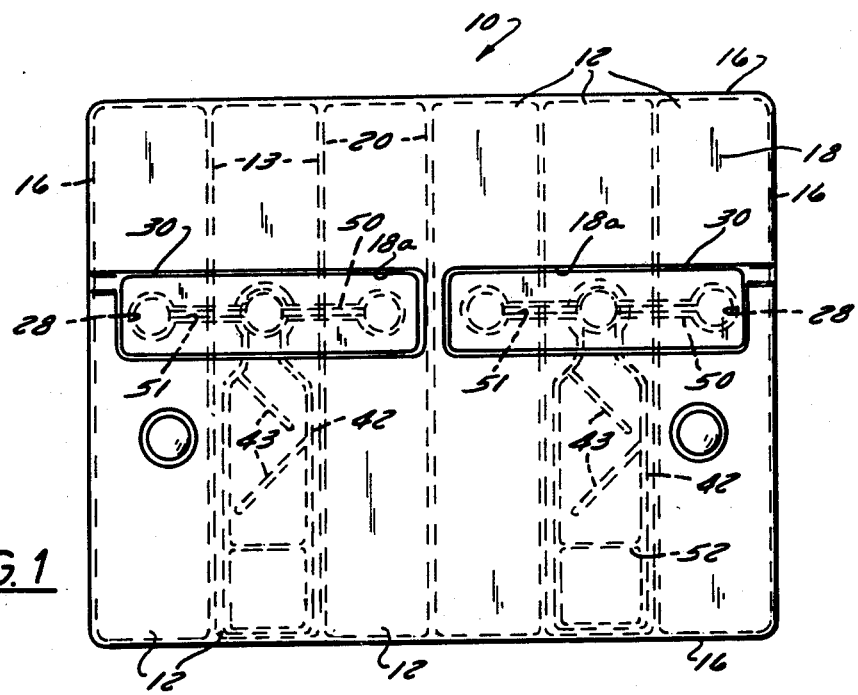
FIG. 1 is a top plan view of a battery with removable manifold strips in accordance with the present invention.

Reference is made to FIG. 1 illustrating, in top plan view, a typical battery enclosure 10 housing a plurality of cells 12 defined by the plurality of parallel dashed lines 13. Enclosure 10 is comprised of side walls 16, a top 18 and a bottom (not shown). A plurality of interior walls 20 (between dashed lines 13) integrally formed with sides 16 act to separate cells 12. The various elements such as electrodes, separators and connecting elements generally present within enclosure 10 and battery cells 12 are not shown to preserve clarity.

When in position, top 18 is sealed to sides 16 in a gas tight relationship. Each of the cells 12, however, is provided with a port 28, shown outlined by dashed lines in FIG. 1, in top 18 which permits visual inspection of cells 12 and addition of electrolyte as needed. During use, however, ports 28 are tightly closed by one or more removable manifold strips 30 which may be positioned, if desired, within a recessed slot 18a of complimentary dimensions provided in top 18 to preserve the flat top configuration of the battery. It is generally desirable to maintain the top of batteries essentially flat to facilitate the use of restraining clamps and the like about enclosure 10 of the battery to prevent displacement thereof when, for example, it is used in a vehicle capable of rapid acceleration or deceleration.

Figure 2:
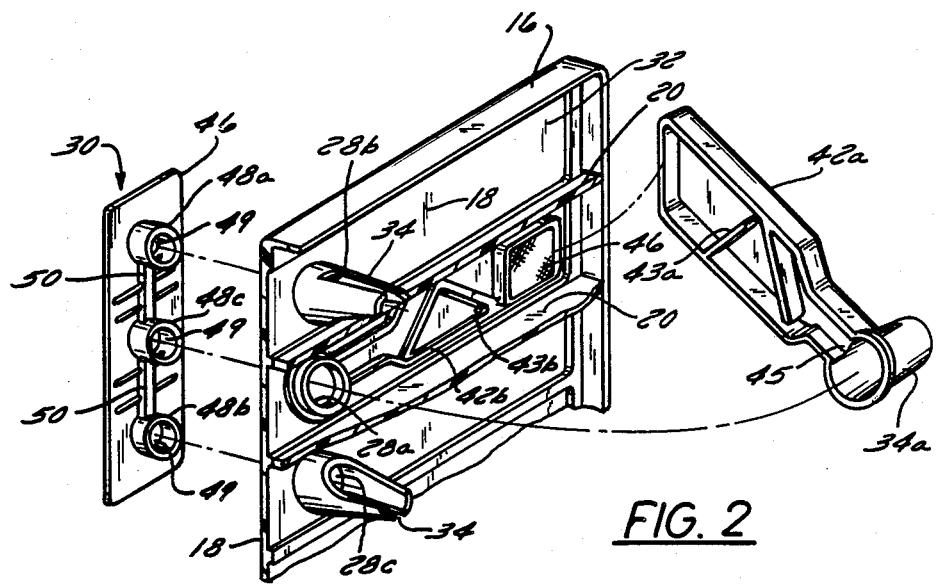
FIG. 2 is an exploded perspective view of a portion of a battery top, flame arrester and a removable manifold strip in accordance with the present invention.

Referring now to the exploded perspective of FIG. 2, it may be seen that the under surface 32 of top 18 is provided with a pair of downwardly extending, cylindrical and split, splash shields 34 circumscribing the outermost and innermost ports 28. The center port 28a is provided shield 34a extending from the section 42a of flame arrester 42 (shown by dashed lines in FIG. 1) when sealed into place. Although for clarity, section 42a is shown separate from section 42b it is normally integrally sealed thereto. Each shield 34 serves to communicate directly from a respective port 28 with the interior of cells 12 and provides normal protection against splashing when additional fluid is added to the electrolyte winding within cells 12.

As depicted in FIG. 1 by dotted lines, a pair of flame arresters 42 is secured to the under surface 32 of top 18 and connected to port 28 in a manner to be described below. It is desirable that the flame arrester 42 be positioned inside battery 10 as opposed to an external position such as on the outside surface of top 18. As stated above, mounting the flame arrester externally can subject the arrester to damage due to mishandling or removal, thus compromising the function of the arrester to diffuse and vent gases generated during battery operation. Additionally, in many instances the exterior surface of a battery is desirably maintained in an essentially flat form to facilitate the use of restraining straps and the like. Flame arrester 42, while relatively small in size, would protrude above the exposed surface of top 18 if attached thereto.

Figure 4:
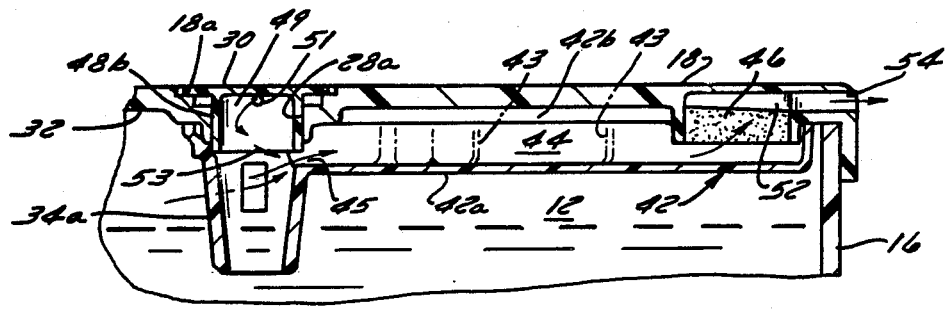
FIG. 4 is a sectional view taken along line 4—4 of FIG. 3.

Flame arrester 42, preferably employed with the battery venting strip in accordance with the present invention, is of the type generally described in the aforementioned U.S. Pat. No. 3,879,227. The essential purpose of arrester 42 is for maximum venting of gases which may be generated by the chemical reaction occuring in the individual cells 12 during operation. Each arrester 42 is secured to surface 32 and communicates with centrally positioned shield 34a via a channel 44 and vent 45 cut into shield 34a as best seen in FIG. 4. A detailed discussion of the particular internal elements of arrester 42 and their description, however, is not essential for understanding of the present invention. For those details, reference should be made to the aforementioned U.S. Pat. No. 3,879,227. Briefly, however, flame arrester 42, as best shown in the perspective of FIG. 2 and a section of FIG. 4, comprises an upper section noted generally as 42b and a lower section 42a. Upper section 42b is largely molded in the undersurface 32 of top 16. Sections 42a and 42b are complimentary to one another and, when sealed together as in FIG. 4, comprise a splash guard 34a about center port 28a, a channel 44 leading from port 28a and guard 34a to diffuser 46 which is secured to top 16. A plurality of baffles 43 formed from complimentary ribs 43a and 43b on the respective surfaces of sections 42a and 42b provide a tortuous path for the gas flow along channel 44 to diffuser 46. Diffuser 46, made of any porous material such as a porous ceramic or polyethylene, inert with respect to the gas, has a chamber 52 between it and the undersurface 32 and communicates with an external vent 54 positioned approximately at the interface of top 18 and side wall 16.

As mentioned before, manifold strip 30 is removable in order to provide access to the interior of each cell 12. In a preferred embodiment, a pair of manifold strips 30 are employed, each provided with a planar or support member 46 from which three cylindrically shaped, annular bosses 48a, 48b and 48c extend as seen in FIG. 2. A manifold member 50, integral with support member 46, bridges the distance between each of the outwardly positioned bosses 48a and 48b and centrally positioned boss 48c. Each manifold member 50 encloses a tunnel 51 which provides gaseous communication among bores 49 of the bosses 48.

Figure 3:
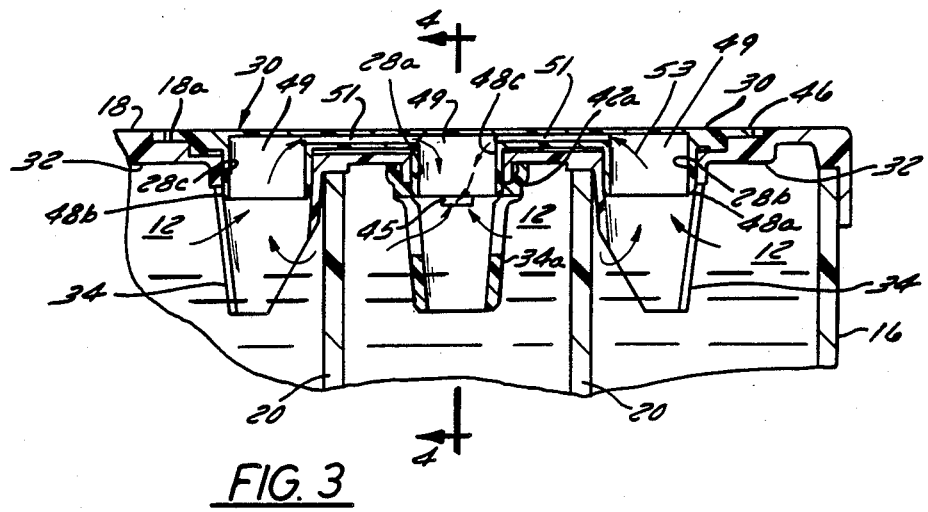
FIG. 3 is a side sectional view of a manifold strip in a position on a battery top.

As perhaps best seen in the sectional views of FIGS. 3 and 4, the particular dimensions of bosses 48 are not critical, needing only a size and shape which permits registration with and a close fit relationship within the internal circumference of ports 28 and cylindrical splash shields 34. When in place, both strips 30 fit within a recess provided in top 18 such that each boss 48 is positioned within a respective port 28 in a sealed relationship. The external dimensions of each boss 48 thus provide an essentially press-fit relationship with respect to port 28 and a gas tight interface. Bores 49 then are in direct gaseous communication with a respective cell 12. As gas emanates from the outwardly and inwardly positioned cells 12, the gas moves, as indicated by the arrows 53, through bores 49 of the respective bosses, through manifold tunnels 51 into the centrally disposed boss 48 and then into channel 44 of flame arrester 42. The gas then moves along the tortuous path provided by baffles 43 and ultimately passes through porous flame retardant member 46. From there the gas moves into chamber 52 above member 46 and out through vent opening 54 in enclosure 10.

Thus, the removable strip 30 provides the valuable advantage of allowing immediate access to cells 12 as desired, yet when secured to top 18 and covering ports 28, provides gaseous communication between each of the cells 12 and an arrester 42. The internal positioning of arrester 42 and venting function thereof thus substantially reducing the likelihood of damage or removal.

Strips 30 are preferably fabricated by an injection molding process using any suitable material, such as polypropylene, which is chemically inert to the varous battery constituents. Once the injection molding tooling has been made, the tunnels 51 of manifold member 50 may be preserved by inserting retractable pins in the proper place of the mold. After the plastic has been injected into the mold and cooled, the pins can be retracted leaving the manifold tunnels 51 intact. The outer ends of tunnels 51 thereof then are sealed, leaving the tunnels 51 connecting only the central boss 48c with bosses 48a and 48b.

It will be understood that the foregoing description is of a preferred exemplary embodiment of the present invention and that the invention is not limited to the specific forms shown. Modifications may be made in design and arrangement thereof within the scope of the present invention, as expressed in the following appended claims.

We claim:

1. A battery having an housing including:
   (a) top member for enclosing a plurality of separated cells, said top member having a plurality of ports, each of which are in gaseous communication with respective cells;
   (b) a flame arrester element disposed within said housing and being in gaseous communication with at least one of said cells; and
   (c) means for removably covering said ports when in association with said top and placing said other cells in gaseous communication with said flame arrester element.

2. The battery of claim 1 in which said removably covering means includes an enclosed channel.

3. The battery of claim 1 in which said removably covering means includes a plurality of extension elements, each extending through a respective port and each defining a bore therein, and an enclosed means for defining a gaseous communication path between said bores.

4. The battery of claim 1 in which said removably covering means includes a multiplicity of extension elements, each defining a bore therein and extending through a respective port and one of said extension elements being in gaseous communication with said one cell, the other of said extension elements being in gaseous communication with said one element.

5. The battery of claim 4 in which said removably covering means includes an enclosed means for defining a gaseous path between said other of said extension elements and said one extension element.

6. A battery having a housing containing a plurality of cells separated by interior walls including:
   (a) a top member having a plurality of ports, each of which are in gaseous communication with respective cells;
   (b) a flame arrester element disposed within said housing with at least one of said cells being in gaseous communication with said flame arrester element;
   (c) a removable support member covering said ports when positioned on said top member;
   (d) a plurality of extensions extending from said support member and each defining a bore therein, each of said extensions extending through a respective port and placing each of said bores in gaseous communication with a respective cell when said support member is positioned on said top member; and
   (e) channel means within said support member for placing all of said bores in gaseous communication with said cells and said flame arrester element.

7. The battery of claim 6 in which said extensions are annular cylindrical members adapted to mate in a gas tight relationship with said top.

8. The battery of claim 7 including more than two cylindrical members with an inside member in gaseous communication with said one cell.

9. The batter having an enclosure of claim 1 wherein said removably covering means including:
   (a) a planar strip having a plurality of annular, open-ended extensions defining an enclosed bore, each of said extensions being integrally connected to said strip around the entire upper circumference thereof and adapted to fit within said ports when said means is associated with said top, and
   (b) manifold means for gaseously connecting said bores.

* * * * *